United States Patent
Quatraro et al.

(10) Patent No.: US 11,079,231 B2
(45) Date of Patent: Aug. 3, 2021

(54) OPTICAL PHASE MODULATING SCHEME OF A MIOC OF AN INTERFEROMETER TYPE FIBER OPTIC GYROSCOPE

(71) Applicant: CIVITANAVI SYSTEMS S.R.L., Pedaso (IT)

(72) Inventors: Enrico Quatraro, San Benedetto del Tronto (IT); Andrea Pizzarulli, Civitanova Marche (IT)

(*) Notice: Subject to any disclaimer, the term of this patent is extended or adjusted under 35 U.S.C. 154(b) by 0 days.

(21) Appl. No.: 16/632,491

(22) PCT Filed: Jul. 24, 2018

(86) PCT No.: PCT/EP2018/025202
§ 371 (c)(1),
(2) Date: Jan. 20, 2020

(87) PCT Pub. No.: WO2019/029845
PCT Pub. Date: Feb. 14, 2019

(65) Prior Publication Data
US 2021/0164782 A1      Jun. 3, 2021

(30) Foreign Application Priority Data
Aug. 7, 2017   (IT) .................. 102017000091341

(51) Int. Cl.
*G01C 19/72*    (2006.01)

(52) U.S. Cl.
CPC .................. *G01C 19/723* (2013.01)

(58) Field of Classification Search
CPC ......... G01J 19/72; G01J 19/723; G01J 19/726
See application file for complete search history.

(56) References Cited

U.S. PATENT DOCUMENTS

| 5,530,545 | A | * | 6/1996 | Pavlath | G01C 19/72 |
| | | | | | 356/460 |
| 5,953,123 | A | | 9/1999 | Jaklitsch et al. | |
| 2015/0009505 | A1 | * | 1/2015 | Lefevre | G01C 19/726 |
| | | | | | 356/460 |
| 2015/0116723 | A1 | * | 4/2015 | Lefevre | G01C 21/00 |
| | | | | | 356/464 |
| 2016/0231120 | A1 | * | 8/2016 | Guattari | G01C 19/721 |

FOREIGN PATENT DOCUMENTS

EP            1499856 A1       1/2005

* cited by examiner

*Primary Examiner* — Michael A Lyons
(74) *Attorney, Agent, or Firm* — Egbert Law Offices, PLLC

(57) ABSTRACT

An optical phase modulating method of a multi-integrated optical circuit of an interferometric fiberoptic gyroscope with a control feedback control with a digital modulation and demodulations approach includes the step of modulating at eight modulation levels. Each modulation levels has a duration of one-quarter of a light propagation time in a fiberoptic coil.

4 Claims, 6 Drawing Sheets

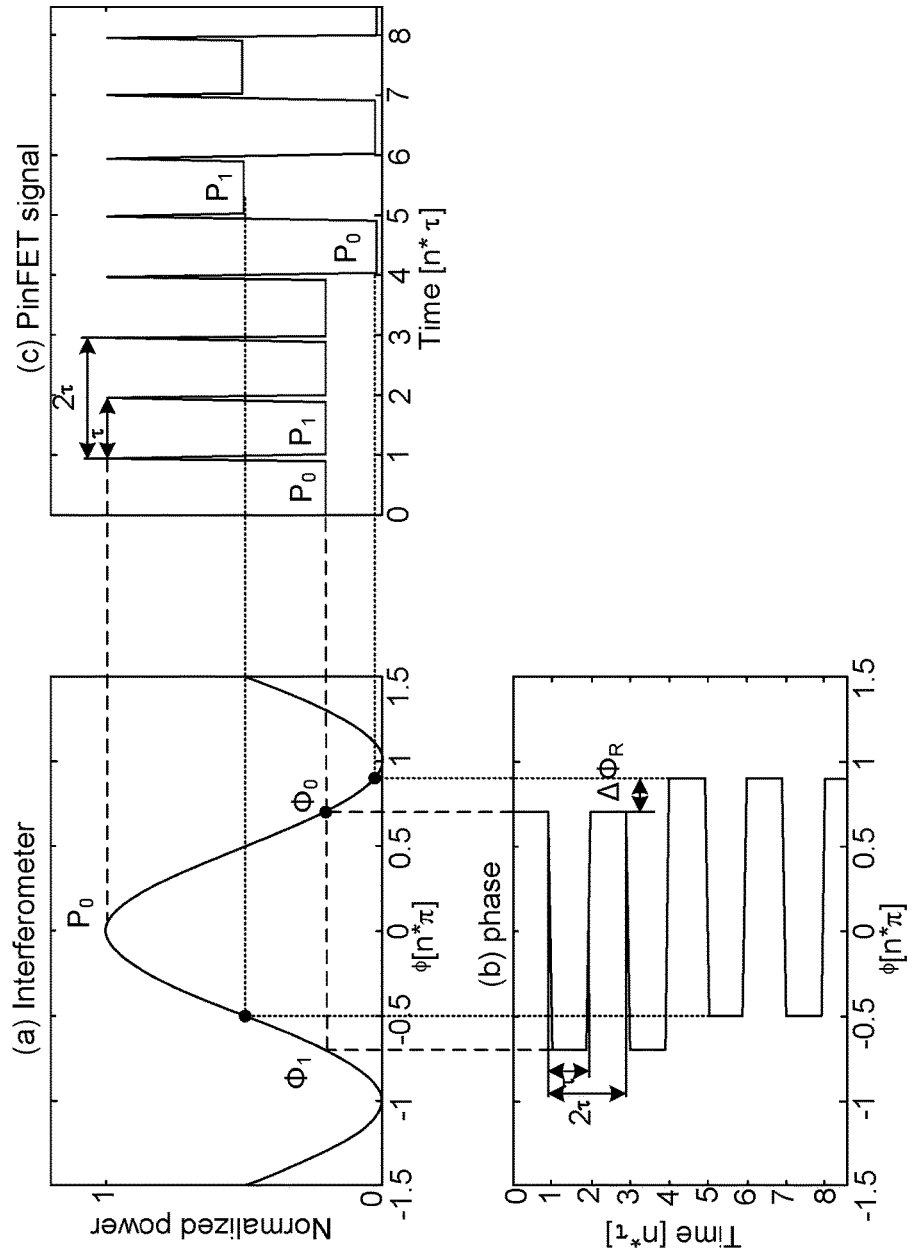

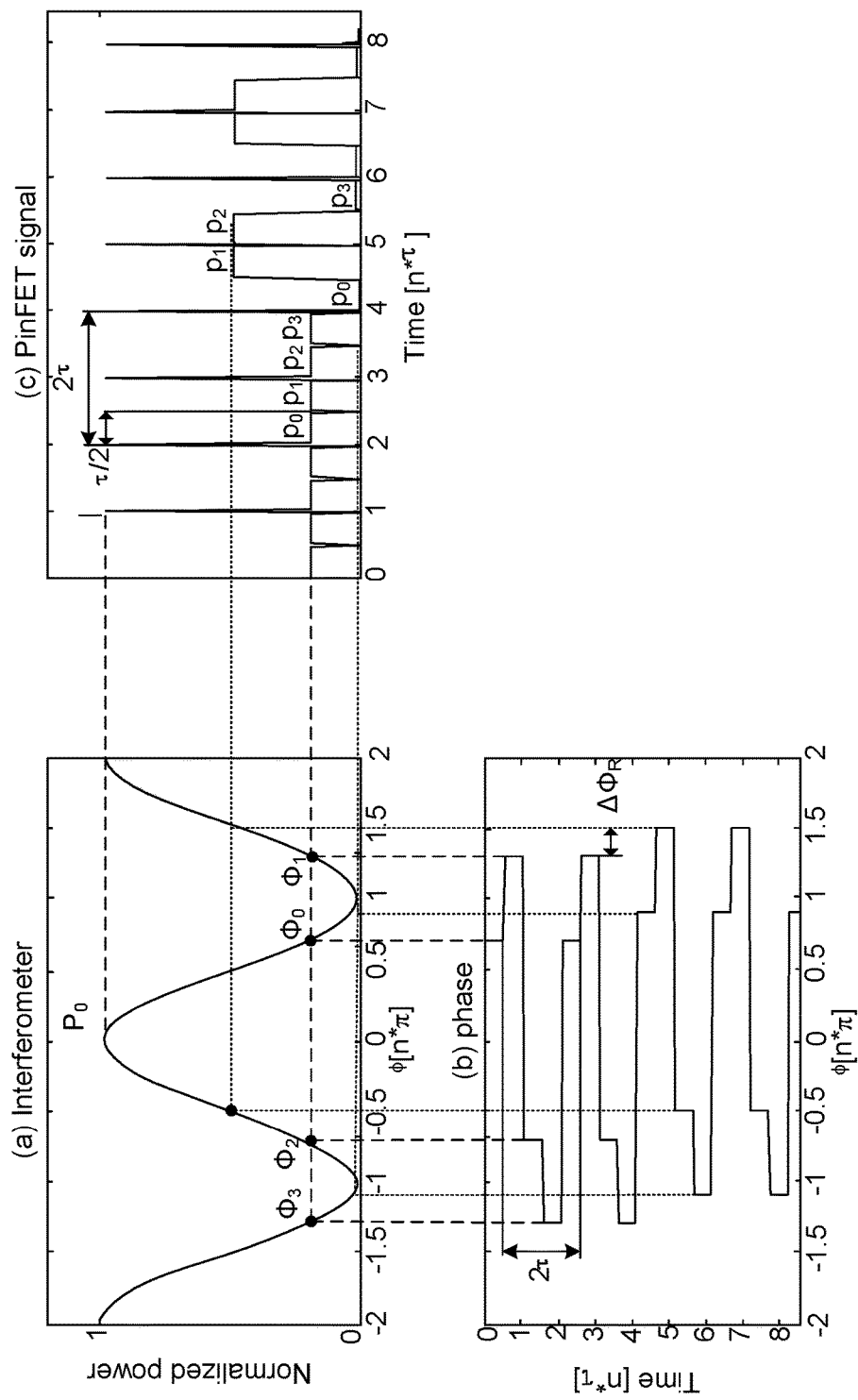

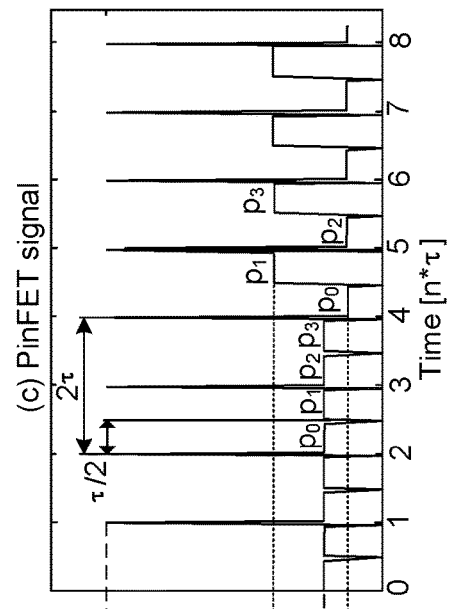
FIG. 4C
PRIOR ART
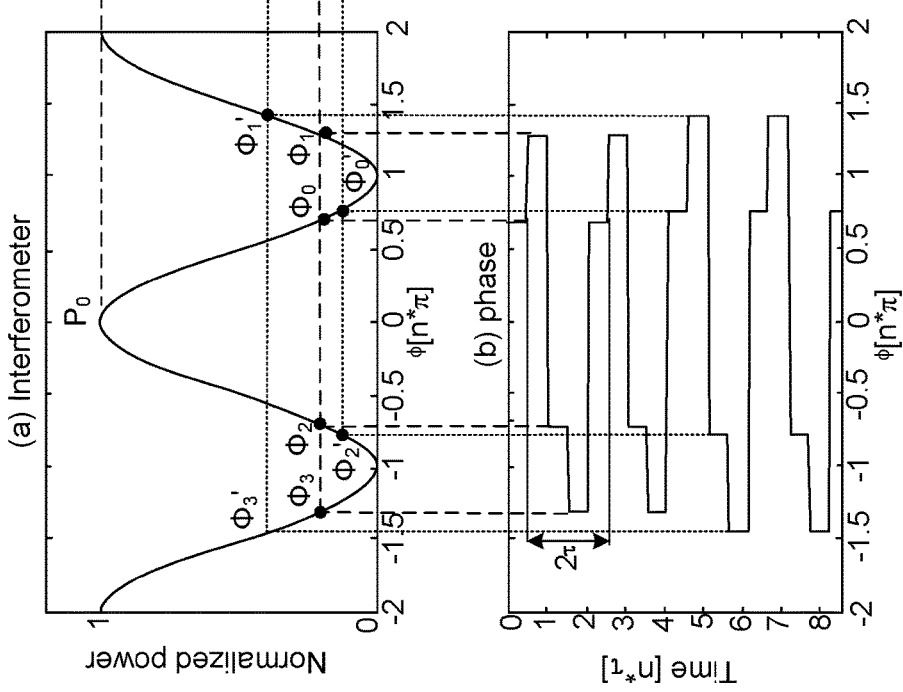
FIG. 4A
PRIOR ART
FIG. 4B
PRIOR ART

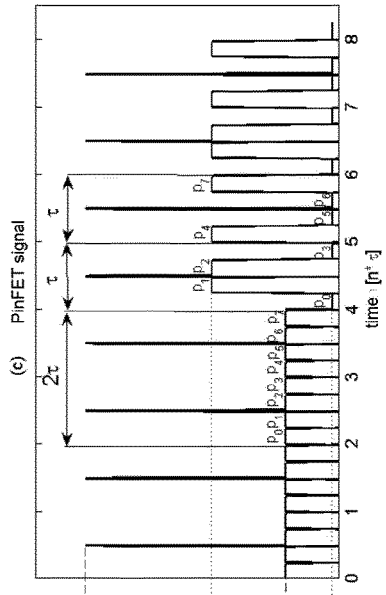
FIG. 5a
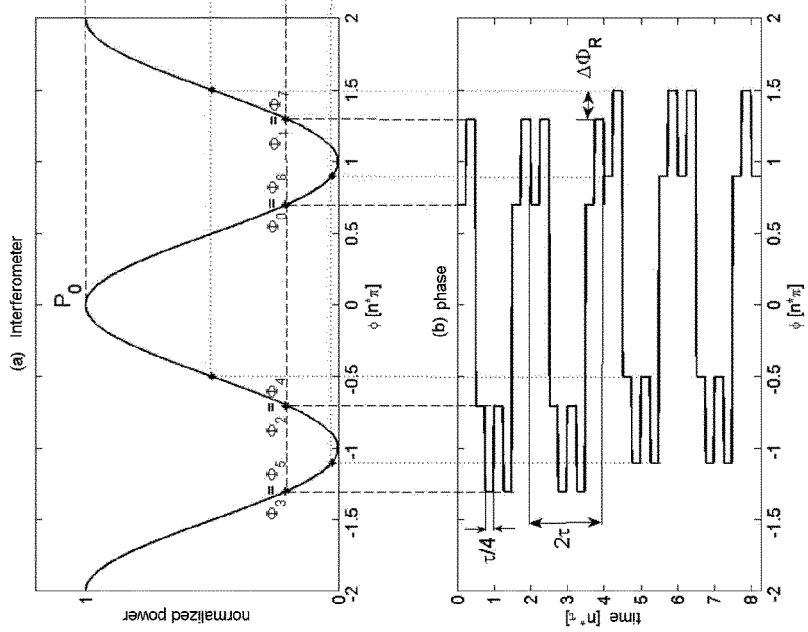
FIG. 5c
FIG. 5b

OPTICAL PHASE MODULATING SCHEME OF A MIOC OF AN INTERFEROMETER TYPE FIBER OPTIC GYROSCOPE

CROSS-REFERENCE TO RELATED APPLICATIONS

STATEMENT REGARDING FEDERALLY SPONSORED RESEARCH OR DEVELOPMENT

INCORPORATION-BY-REFERENCE OF MATERIALS SUBMITTED ON A COMPACT DISC OR AS TEXT FILE VIA THE OFFICE ELECTRONIC FILING SYSTEM (EFS-WEB)

STATEMENT REGARDING PRIOR DISCLOSURES BY THE INVENTOR OR A JOINT INVENTOR

BACKGROUND OF THE INVENTION

Field of the Invention

This invention relates the inertial navigation and position systems sector, and specifically relates an optical phase modulation scheme for an interferometer fiber optic gyroscope (I-FOG), with closed-loop feedback control equipped with a digital mod/demod approach by allowing said modulation scheme to double the feedback processing speed and obtain a more accurate and linear dynamic response of the sensor when measuring rotation rate profiles characterized by high variations.

Description of Related Art Including Information Disclosed Under 37 CFR 1.97 and 1.98

An I-FOG is a sensor consisting of a fiber interferometer that takes advantage of the Sagnac effect to measure the rotation rate of its sensitive element, given by a closed-loop path (typically a fiber optic coil), depending on the difference in optical path produced between two optical rays travelling in opposite directions in the sensitive element thanks to the relativistic principle of independence of the light speed from the considered reference system. The difference in the optical path implies a phase difference between the two propagating and counter-propagating rays, which is expressed in a variation of the optical power, measured by a photo-detector (typically a PinFET), which occurs when they interfere.

The $\Delta\Phi_R$ phase shift produced by the Sagnac effect, when the sensitive element is subjected to a rotation rate $\omega$ and when said sensitive element consists of a fiber optic coil having diameter D and length L, is given by the formula:

$$\Delta\Phi_R = \frac{2\pi L D}{\lambda c}\omega \tag{1}$$

where $\lambda$ and c are, respectively, the wavelength and the light speed in the vacuum. When the two rays interfere, a cosinusoidal response is obtained of the resulting optical power, which is measured by the photo-detector and which is given by the formula:

$$P(\Delta\Phi_R) = \frac{P_0}{2}[1 + \cos\Delta\Phi_R] \tag{2}$$

Typically, in the various schemes of open-loop or closed-loop control of the I-FOG sensors, the light injected into the sensitive element is modulated by an electro-optical phase modulator driven by a voltage signal—the waveform of which changes depending on the modulation scheme used—by means of an analogue modulation channel. A voltage signal applied to the electrodes of the phase modulator causes a phase shift of the light that crosses it which, in first approximation, is proportional to the voltage according to the equation:

$$\Phi_{MOD}(t) = \frac{V_{MOD}(t)}{V_\pi}\pi \tag{3}$$

where $V_\pi$ is a characteristic parameter of the phase modulator often indicated as half-wave voltage.

The voltage signal applied to the phase modulator allows forcing a time dependent phase pattern, which allows the selection of an accurate working point on the interferometer and to obtain a more accurate reading of the phase depending on the measurement of the optical power through adequate demodulation of the signal read by the photo-detector. Considering that the rotation rate $\omega$, and consequently also the $\Delta\Phi_R$ phase shift, are generally functions of the time, the photo-detector signal becomes:

$$P(t) = P(\Delta\Phi_R(t) + \Phi_{MOD}(t)) = \frac{P_0}{2}[1 + \cos(\Delta\Phi_R(t) + \Phi_{MOD}(t))] \tag{4}$$

The $\Phi_{MOD}(t)$ modulation is generally indicated as biasing modulation. In the closed-loop control schemes of the I-FOG, the biasing modulation is flanked by $\Phi_{RET}$ feedback modulation which allows to measure and compensate the $\Delta\Phi_R$ phase shift so that the interferometer can operate constantly in the established working point:

$$P(t) = P(\Delta\Phi_R(t) + \Phi_{MOD}(t) + \Phi_{RET}(t)) = \tag{5}$$
$$\frac{P_0}{2}[1 + \cos(\Delta\Phi_{RET}(t) + \Phi_{MOD}(t) + \Phi_{RET}(t))]$$

which becomes:

$$P(t) = P(\Phi_{MOD}(t)) = \frac{P_0}{2}[1 + \cos\Phi_{MOD}(t)] \tag{6}$$

when $\Phi_{RET} = -\Delta\Phi_R$.

The different approaches in the control of an I-FOG differ substantially for the way in which the $\Phi(t) = \Phi_{MOD}(t) + \Phi_R(t)$ modulation scheme is implemented and the consequent method of demodulation of the signal measured by the photo-detector.

The known technique of modulation refers to the so-called all-digital control approach, where $\Phi_{MOD}(t)$ is obtained by a square wave with $2\tau$ period, where $\tau$ is the propagation time of the light in the sensitive element of the I-FOG, hereafter identified as a coil, and where the two levels of modulation last $\tau$ and their value is $\Phi_0 = \pi - \alpha$ and $\Phi_1 = \pi + \alpha$, which makes it possible to have two levels at the interferometer, in stationary conditions and of equal value, i.e.

$$p_0 = p_1 = \frac{P_0}{2}[1 - \cos\alpha].$$

The characteristics and benefits of the control scheme with all-digital approach are shown in [1], while in [2] it is shown a variation in which the modulation pattern exhibits 4 $\Phi_0 = \pi - \alpha$, $\Phi_1 = \pi + \alpha$, $\Phi_2 = -\pi + \alpha$ e $\Phi_3 = -\pi - \alpha$ phase levels, each of duration equal to $\pi\backslash 2$.

In particular, the scheme illustrated in [2] constitutes an improvement over the scheme proposed in [1] as it allows the interferometer to identify four levels of power that, in stationary conditions and if the analogue channel of modulation gain is set correctly, are all equal to one another and equal to $$p_0 = p_1 = p_3 = p_3 = \frac{P_0}{2}[1 - \cos\alpha],$$

and that, in the presence of an angular rotation, allows an easy measurement of the produced $\Delta\Phi_R$ phase shift since in first approximation proportional to $$\in_R = (p_0 + p_3) - (p_1 + p_2). \quad (7)$$

Moreover, an error in the analogue channel of modulation gain produces a signal $$\in_G = (p_0 + p_2) - (p_1 + p_3) \quad (8)$$

that can be used to follow the variations of the half-wave voltage $V\pi$ of the phase modulator, caused, for example, by temperature variations, and maintain a correct phase modulation over time.

In both the modulation schemes proposed in [1] and [2] the $\Phi_{RET}$ phase shift that must be supplied to the phase modulator so as to follow that produced by the Sagnac effect is obtained by means of a $V_{RET}$ analogue modulation signal given by a step ramp of $\Delta V_{RET}$ step amplitude, generally indicated as the serrodyne ramp, where the duration of each step must be $\tau$ and the phase step amplitude must be given by the equation:

$$\Phi_{RET} = \frac{\Delta V_{RET}}{V_\pi}\pi = -\Delta\Phi_R \propto \sum \epsilon_R \quad (9)$$

For the feedback control to correctly operate, $\Delta V_{RET}$ must be, in first approximation, proportional to the integral of the instant phase error $\epsilon_R$. To obtain the correct value of the serrodyne ramp step, therefore, it will be necessary to collect the two values $p_0$ and $p_1$, in case of a modulation scheme based on two modulation levels, and the four values $p_0$, $p_1$, $p_2$ and $p_3$ in case of the four levels modulation scheme, at the photo-detector, hereafter referred to as PinFET. In both cases, it will be necessary to wait a minimum time equal to the entire control cycle, given by one entire period of the modulation signal, or $2\tau$, to have an updated value of $\epsilon_R$.

This causes a minimum delay in the feedback control of the sensor which will be directly linked to the length of the optical path of the light rays and hence to the propagation time of the sensitive element. An additional delay due to the collection, filtering and processing of the signal is generally necessary for the PinFET to convert it to digital mode and send it to the processor that demodulates it.

One of the advantages of I-FOG sensors is their extreme scalability: performances are directly linked to the geometrical dimensions of the coil and quantity of fiber used. The larger the size and greater the length of the fiber used for the coil, the higher the performances will be. But this implies that the more accurate sensors have larger control delay times than sensors that use less fiber, that is, the intrinsic bandwidth of I-FOG sensors configured in closed-loop formation is inversely proportional to the length of the fiber used. The increased latency in control may lead, in extreme dynamic conditions, or in presence of variable angular rate profiles and high angular accelerations, to an error in feedback control and to erroneous measurement of the angular rate.

FIG. 1 illustrates the basic and high level scheme of an I-FOG system in "all-digital" control configuration, consisting of a broadband optical source (1), an optical coupler (2), a phase modulator in lithium niobate (3), also known as a Multi Integrated Optical Circuit o MIOC, a fiber optic coil (4), a photo-detector or PinFET (5), an analogue-to-digital signal conversion block (6), a processor unit (7), a digital-to-analogue signal conversion block (8) and a modulation channel (9) that carries the modulation signal to the MIOC.

The light produced by the source (1) is sent through the coupler (2), to the MIOC (3) where it is divided into two rays that are injected into the two branches of the coil (4). After the propagation in the coil (4), the two rays return to the modulator (3) where they recombine, interfering. The recombined ray thus obtained is conveyed, still through the coupler (2), to the PinFET (5) where it is converted into a voltage signal proportional to its power. The voltage signal is sampled in the analogue/digital conversion block (6) and demodulated in the processor unit (7). This is where, in addition to the rotation rate of the coil, the value of the serrodyne ramp step is determined, which is then added to the biasing modulation pattern, thereby generating the digital modulation signal. It is then converted into an analogue voltage signal through the digital/analogue conversion block (8) and the signal thus obtained is conveyed to the MIOC electrodes through the analogue modulation channel (9) to modulate the light phase passing through its two branches.

FIGS. 2a, 2b and 2c illustrate:
raised cosine pattern of interference obtained on the PinFET depending on the $\Delta\Phi$ (FIG. 2a) phase shift,
the selected working point depending on the biasing modulation $\Phi_0$ e $\Phi_1$ (FIG. 2b) given by the $p_0$ and $p_1$ levels, and
the signal obtained at the PinFET over time (FIG. 2c) when the sensor is at rest and when it is subjected to a rotation that produces a $\Delta\Phi_R$ phase shift due to the Sagnac effect in case of control scheme based on 2 levels of modulation [1]. It is noted how the $\Phi_0$ and $\Phi_1$ phases have a duration $\tau$ and, to obtain an updated measurement of the $\Delta\Phi_R$ phase shift, given by $\epsilon_R = p_0 - p_1$, it is necessary to wait for a time equal to $2\tau$.

FIGS. 3a, 3b and 3c illustrate:
the interference pattern obtained at the PinFET depending on the $\Delta\Phi$ phase shift (FIG. 3a),
the selected working point depending on the biasing modulation $\Phi_0$, $\Phi_1$, $\Phi_2$ and $\Phi_3$ (FIG. 3b) given by the $p_0$, $p_1$, $p_2$ and $p_3$ levels, and
the signal obtained on the PinFET depending on time (FIG. 3c) when the sensor is subjected to rotation producing a $\Delta\Phi_R$ phase shift due to the Sagnac effect in case of control scheme with 4 levels of modulation [2].

In addition, FIG. 4 illustrates what happens in stationary conditions when the modulation channel gain is not correct, so that the equations $\Phi_0 = \pi - \alpha$, $\Phi_1 = \pi + \alpha$, $\Phi_2 = -\pi + \alpha$ e $\Phi_3 = -$ π−α no longer apply. In particular, the pattern of the signal at the PinFET can be observed in the time that derives from this condition (FIG. 4c).

As can be seen from FIGS. 3 and 4, in first approximation it is possible to demodulate the signal at the PinFET to obtain simply and independently the variables that, in closed-loop, will be reset to close the feedback control of $\Delta\Phi_R$ phase shift and the feedback control of the gain on the modulation channel, given respectively by $\varepsilon_R=(p_0+p_3)-(p_1+p_2)$ and $\varepsilon_G=(p_0+p_2)-(p_1+p_3)$. However, also in this case, given that the duration of each level of modulation is τ\2, to obtain an updated value of the phase and instant gain errors $\varepsilon_R$ and $\varepsilon_G$, it will be necessary to wait, as in the case of modulation on 2 levels, for a time equal to 2τ.

For both control schemes of the I-FOG sensors illustrated so far, in order to follow the phase shift produced by the Sagnac effect, the serrodyne ramp step must be updated every τ, but the step value, just like the production of the measure of angular rate in output from the control unit, will be updated only every 2τ.

In the state of the art, in the sector of the inertial navigation and position systems the following documents are known:

U.S. Pat. No. 5,953,123 A that discloses an improved method and mechanism by which to align closed loop interferometric fiber optic gyroscopes, where method and means include aligning the gyroscope periodically at fixed time intervals.

EP1499856A1 that discloses a method for suppressing dead band errors that may be present in a closed loop I-FOG.

The modulation scheme of the above-cited documents has a duration of each modulation level equal to τ and therefore it is not able to obtain an improvement of the dynamic response of the sensors, as it allows to obtain a valid measure of $\varepsilon_R$ every 2τ.

BRIEF SUMMARY OF THE INVENTION

Object of this invention is to correct the $\Delta\Phi_R$ phase shift caused by the Sagnac effect with a new error measurement $\varepsilon_R$ in the I-FOG sensor with a period τ, that is, at the propagation time of the light in the sensitive element of the sensor.

Another object of this invention is to correct the modulation channel gain of the MIOC with a new error measurement $\varepsilon_G$, in an I-FOG sensor with a period τ, that is, at the propagation time of the light in the sensitive element of the sensor.

Another object of this invention is the reduction of the vibration rectification phenomenon of the I-FOG sensors, in the absence of any system of mechanical damping, higher than one order of magnitude.

Another object of this invention is to obtain higher dynamic performance with the same fiber length by doubling the demodulation frequency of the signal read by the interferometer and reducing the control latency from 2τ to τ.

Another object of this invention is to improve the dynamic response of the sensors by doubling their intrinsic bandwidth, and thereby achieve higher levels of accuracy and linearity using the same quantity of fiber.

A further object of this invention is to double the tracking speed of the feedback control of the phase shift produced by the Sagnac effect, and consequently the bandwidth of the I-FOG sensors.

Last but not least of the objects of this invention is to obtain a more accurate and linear dynamic response of the I-FOG sensors when measuring rotation rates and profiles characterized by extreme variations.

Further characteristics and advantages of the invention will become clear from the description of a preferred embodiment but not exclusive, of a MIOC modulation technique at 8 levels, where the duration of each level of modulation is τ\4, object of this patent application, illustrated by way of indication but not limited in the drawing units in which:

BRIEF DESCRIPTION OF THE SEVERAL VIEWS OF THE DRAWING(S)

FIGS. 2a-2c illustrate respectively a raised cosine pattern of interference obtained on the PinFET depending on the ΔΦ phase shift the selected working point depending on the biasing modulation given by the $p_0$ and $p_1$ levels, and the signal obtained at the PinFET over time.

FIGS. 3a-3c illustrate respectively the interference pattern obtained at the PinFET depending on the ΔΦ phase shift, the selected working point depending on the biasing modulation, and the signal obtained on the PinFET depending on time.

FIG. 4 illustrates what happens in a stationary condition when the modulation channel gain is not correct.

FIGS. 5a, 5b and 5c illustrate a modulation scheme at 8 levels when the sensor is at rest and when it is subjected to rotation at constant angular rate ω, which generates a $\Delta\Phi_R$ phase shift by the Sagnac effect.

DETAILED DESCRIPTION OF THE INVENTION

Figure 1:
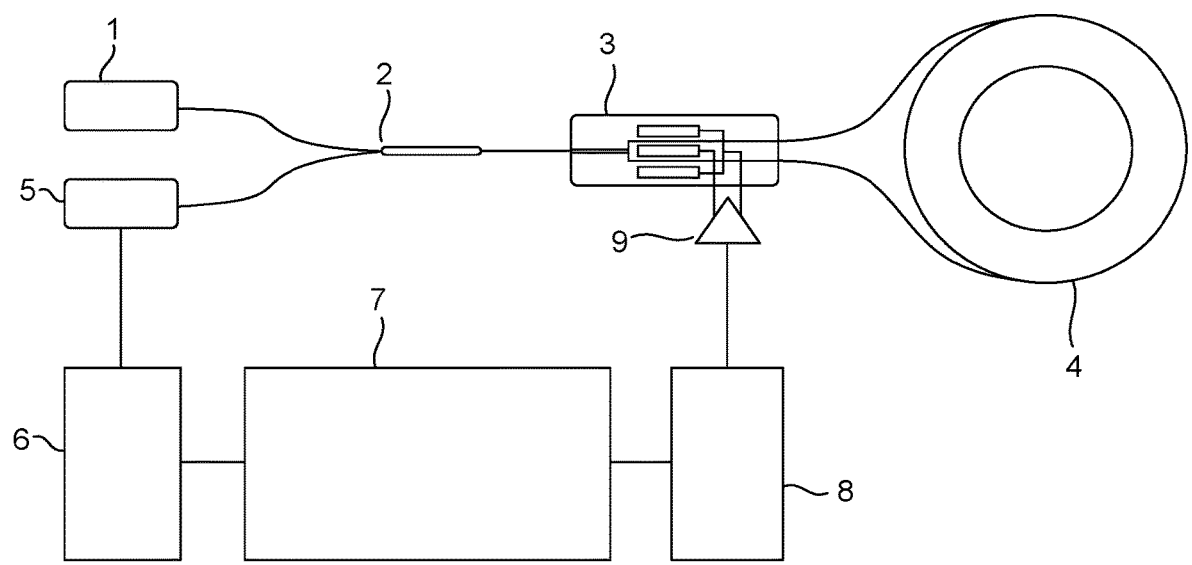
FIG. 1 illustrates the basic and high level scheme of an I-FOG system in an "all-digital" control configuration.

According to a preferred, but not limited embodiment, this invention relates a modulation technique of a MIOC of an interferometer fiber optic gyroscope, I-FOG, with closed-loop feedback control with application of a digital mod/demod approach. Said technique for modulation of the MIOC is an 8-level scheme and the duration of each level of modulation is τ\4.

The technique for modulation of I-FOG sensors that is object of this patent application makes it possible to obtain higher dynamic performances with the same fiber length, doubling the frequency of demodulation of the signal rad at the interferometer and reducing control latency from 2τ to τ. This allows, with respect to the all-digital control techniques known in the state of the art, the dynamic response of the sensors to be improved, doubling the intrinsic bandwidth and reaching higher levels of accuracy and linearity with the same quantity of fiber.

As can be seen in FIG. 5, illustrating the 8-level modulation scheme which drive the MIOC appropriately when the sensor is at rest and when it is subjected to rotation with constant angular rate ω, which generates a $\Delta\Phi_R$ phase shift by the Sagnac effect, a periodical phase pattern can be identified, through the modulation channel and control logic, given by $\Phi_0=\pi-\alpha$, $\Phi_1=\pi+\alpha$, $\Phi_2=-\pi+\alpha$, $\Phi_3=-\pi-\alpha$, $\Phi_4=-\pi+\alpha$, $\Phi_5=-\pi-\alpha$, $\Phi_6=\pi-\alpha$ e $\Phi_7=\pi+\alpha$ (FIG. 5b) which will correspond, at the interferometer to the values $p_0$, $p_1$, $p_2$, $p_3$, $p_4$, $p_5$, $p_6$, $p_7$. The duration of each of these values will be τ/4 (FIG. 5c) and, once again, the duration of the entire control cycle of the I-FOG will be $2\tau$. However, it will be noted how the following equivalences apply:

$$\Phi_4 = \Phi_2 \xrightarrow{implies} p_4 = p_2 \quad (10)$$
$$\Phi_5 = \Phi_3 \xrightarrow{implies} p_5 = p_3$$
$$\Phi_6 = \Phi_0 \xrightarrow{implies} p_6 = p_0$$
$$\Phi_7 = \Phi_1 \xrightarrow{implies} p_7 = p_1$$

To modify the biasing modulation pattern so as to cancel the effect of the $\Delta\Phi_R$ phase shift it will be necessary to add the biasing signal provided to the MIOC by a serrodyne ramp with a step having $\Delta V_{RET}$ amplitude of duration $\tau$ and proportional to the separation of the levels p measured at the PinFET. But, while with the techniques described in [1] and [2] it was necessary to wait for a time $2\tau$ to have a set of updated samples so as to determine the $\Delta V_{RET}$ value, which has been said to be, in first approximation, proportional to the integral of the instant $\varepsilon_R$ phase error, making it necessary to maintain the correction value unchanged for the next 2 steps of the serrodyne ramp, in the new proposed modulation scheme, as demonstrated by formulas (7) and (9), equivalences (10) and FIG. 5c, at each $\tau$ a complete and updated set of values $p_0$, $p_1$, $p_2$, $p_3$ will be available to determine:

$$\varepsilon_R = (p_0 + p_3) - (p_1 + p_2) = (p_6 + p_5) - (p_7 + p_4) \quad (11)$$

and $$\Delta V_{RET} \propto \Sigma \varepsilon_R \quad (12)$$

The value of the serrodyne ramp step (and angular rate data) can therefore be updated every $\tau$, thus doubling the tracking speed of the feedback control of the phase shift produced by the Sagnac effect and, consequently, the bandwidth of the I-FOG sensor.

With the $\varepsilon_R$ error measurement there is the possibility of correcting the $\Delta\Phi_R$ phase shift produced by the Sagnac effect in the I-FOG sensor with a period $\tau$, that is, for the time necessary for propagation of the light in the sensitive element of the sensor.

The benefits of this innovation can be imagined by thinking of a situation where the rotation rate of the sensor is not constant, but varies very quickly and, for example, between two successive time intervals $\tau$ the rotational speed $\omega$ has undergone a large variation (not a difficult thing in the presence of high entity frequency vibrations).

By using the prior techniques, by upgrading $\varepsilon_R$ only every $2\tau$, the phase variations produced by the Sagnac effect will be tracked with the same $\Delta V_{RET}$ correction value for two consecutive times, producing a $\Phi_{RET}$ phase that would no longer meet the $\Phi_{RET} = -\Delta\Phi_R$ equality, hence committing an error that, in highly performing sensors—that can require a quantity of fiber greater than 2,000 m and consequently a propagation time $\tau$ in the coil not negligible in presence of high dynamics—can become significant and also lead to instability of the feedback control. In fact, it must be reminded that the interference pattern of the light rays after the propagation in fiber is a raised cosine and, when moving away from the selected working point, the non-linear nature of that signal can be rapidly manifested. This phenomenon may even be exacerbated by an incorrect tracking by the feedback control.

Thanks to an increase in the feedback dynamics of a factor of 2, the 8-level modulation technique greatly mitigates this phenomenon by reaching, for example, for a 2,000 m of fiber sensor, the same control speed and bandwidth that was, with the techniques illustrated in [1] and [2], for a sensor of 1,000 m, and to obtain, at the same fiber length, a reduction in the vibration correction effects of the sensors output, in the absence of any mechanical damping system, equal to at least one order of magnitude.

Figure 6A:
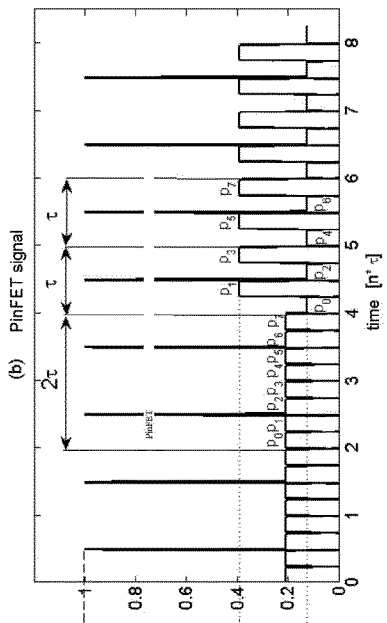
FIG. 6 illustrates the effects of a gain error on the analogue modulation channel in stationary conditions when using the 8-level modulation scheme.
Figure 6B:
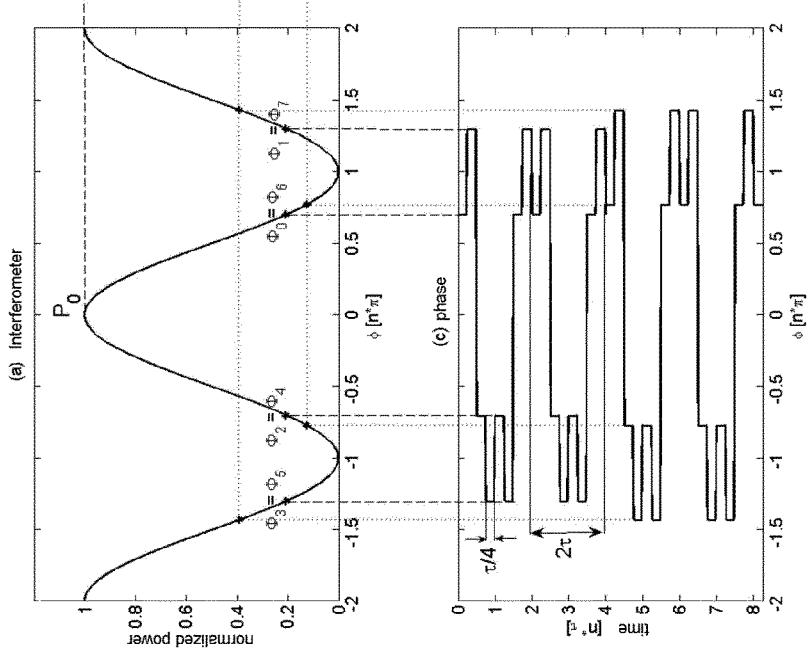
Figure 6C:
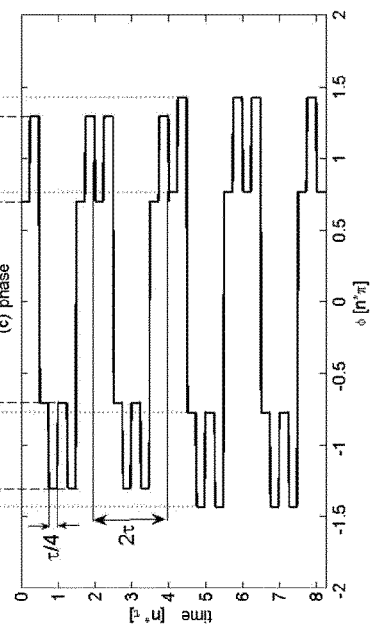

By observing FIG. 6, showing the effects of an analogue modulation channel gain error under stationary conditions when using the modulation technique, object of this patent application, it can be understood how also the correction speed of the gain error can be doubled, being able to evaluate $\varepsilon_G$ at every $\tau$ through the formula:

$$\varepsilon_G = (p_0 + p_2) - (p_1 + p_3) = (p_6 + p_4) - (p_7 + p_5) \quad (13)$$

and considering the equalities expressed in (10).

But in this case the benefits are less apparent since the MIOC half-wave voltage variations, object of the feedback effected on the modulating channel gain, are related to generally slow phenomena, such as temperature variations. With the error measurement $\varepsilon_G$ it is possible to correct the MIOC modulation channel gain, in an I-FOG sensor, with periodicity equal to $\tau$, that is, at the light propagation time in the sensing element of the sensor.

The 8-level modulation technique allows obtaining a more accurate and linear dynamic response to the I-FOG sensors when measuring rotating rate profiles characterized by high variations (strong angular accelerations), such as it happens, for example, in the presence of vibrations. This allows mitigating the distortion effects that may occur due to the nonlinear nature of the signal measured at the interferometer, given by a raised cosine, and the latency of the feedback control.

Through modulation technique, object of this patent application, the vibration rectification phenomenon of the I-FOG sensors can be reduced in absence of any mechanical damping system by a factor greater than one order of magnitude.

The materials and dimensions of the invention as described above, illustrated in the accompanying drawings and as claimed below, may be any according to the requirements. In addition, all details are replaceable with other technically equivalent, without departing from the protective scope of this patent application.

The invention claimed is:

1. An optical phase modulating method of a multi-integrated optical circuit (MIOC) of an interferometric fiberoptic gyroscope (I-FOG) with a control loop feedback control with a digital modulation and demodulation approach, the optical phase modulating method comprising:
   modulating at eight modulation levels wherein each modulating level has a duration of one-quarter of a light propagation time $\tau$ in a fiberoptic coil.

2. The optical phase modulating method of claim 1, further comprising:
   correcting a $\Delta\Phi_R$ phase shift produced by a Sagnac effect in a sensor of the interferometric fiberoptic gyroscope after an $\varepsilon_R$ error measure with a period equal to the light propagation time $\tau$.

3. The optical phase of claim 1, further comprising:
   correcting the MIOC modulation channel gain in a sensor of the I-FOG after an $\varepsilon_G$ error measure equal to the light propagation time $\tau$.

4. The optical phase of claim 1, wherein a control frequency of the fiberoptic coil of a given length is increased by a factor of two as a consequence of the modulation level being one-quarter of the light propagation time $\tau$.

\* \* \* \* \*